June 16, 1942.  G. GRUBB  2,286,205
HEAT TRANSFER SYSTEM
Filed Sept. 17, 1938  3 Sheets-Sheet 1

INVENTOR.
Gunnar Grubb
BY Elf Fenander
his ATTORNEY.

June 16, 1942.   G. GRUBB   2,286,205
HEAT TRANSFER SYSTEM
Filed Sept. 17, 1938   3 Sheets-Sheet 2
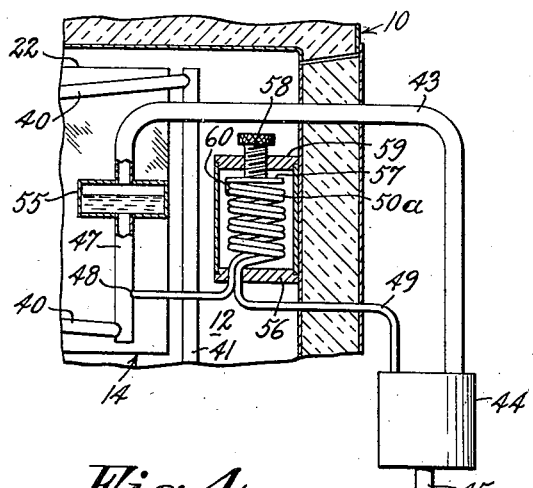
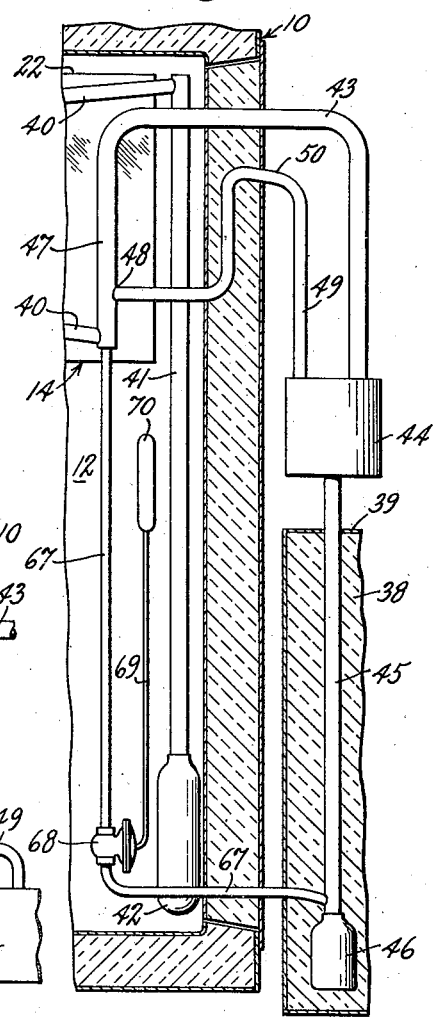
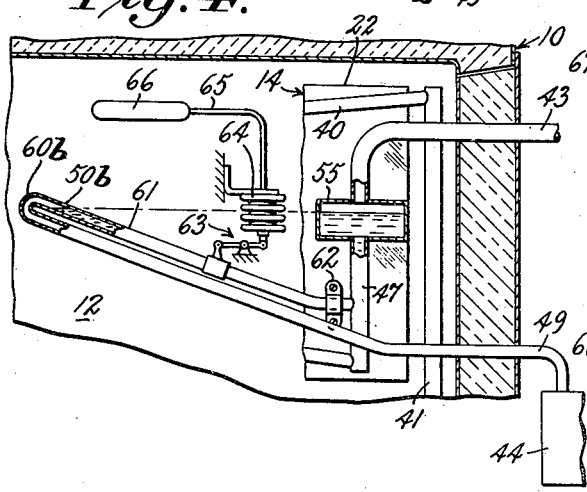
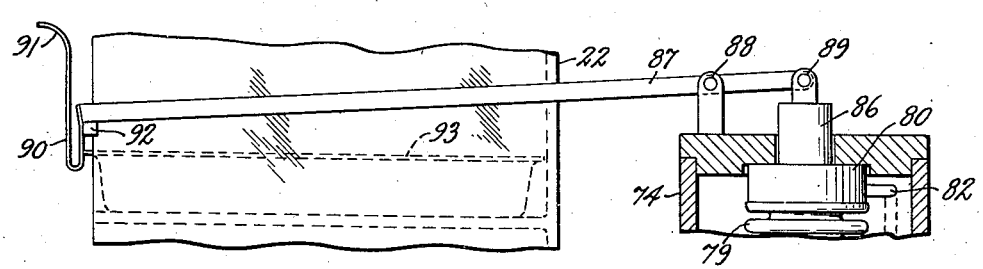
INVENTOR.
Gunnar Grubb
BY
Ed Fernander
his ATTORNEY.

Patented June 16, 1942

2,286,205

UNITED STATES PATENT OFFICE 2,286,205

HEAT TRANSFER SYSTEM

Gunnar Grubb, Stockholm, Sweden, assignor, by mesne assignments, to Servel, Inc., New York, N. Y., a corporation of Delaware Application September 17, 1938, Serial No. 230,401
In Germany September 30, 1937

15 Claims. (Cl. 62—5)

This invention relates to heat transfer systems, and more particularly to the art of transferring heat from a heat source to a place of heating, as an evaporator or cooling element of a refrigeration system, for example.

When an evaporator or cooling element is defrosted by heating, the necessity of modifying the operation of a refrigeration system to cause defrosting is avoided. Heating of an evaporator or cooling element may be effected indirectly by a heat transfer system which contains a fluid for transferring heat from a source of heat to the evaporator. Besides transferring heat to cause defrosting of an evaporator, such a heat transfer system may be utilized to control the temperature of an enclosed space cooled by the evaporator.

It is an object of the invention to provide an improved heat transfer system for transferring heat to an apparatus part, as an evaporator of a refrigeration system, for example, whereby heat is automatically transferred intermittently and at desired intervals of time. Another object is to provide such a heat transfer system which is flexible in operation and may be utilized to control the temperature of an enclosed space cooled by an evaporator as well as effect automatic defrosting of the evaporator at desired intervals of time.

This is accomplished by providing a heat transfer system containing a volatile liquid which vaporizes at a high temperature place of vaporization associated with a source of heat and condenses at a place of condensation in heat transfer relation with an evaporator. To effect intermittent transfer of heat, volatile liquid is withheld from the place of vaporization and conducted thereto at desired intervals of time from a place of accumulation in the system. Intermittent heat transfer is effected automatically by supplying volatile liquid to the place of vaporization when the liquid rises to a predetermined level at the place of accumulation.

When volatile liquid is supplied to the place of vaporization, the pressure in the heat transfer system increases due to vaporization of liquid. This pressure increase in the system is utilized to cause volatile liquid at the place of accumulation to flow to a lower temperature place of vaporization. Liquid vaporizes slowly in the lower temperature place of vaporization and such vapor also condenses at the place of condensation and accumulates in the place of accumulation. When liquid rises to the predetermined level at the place of accumulation, volatile liquid is again supplied to the high temperature place of vaporization after a desired interval of time, whereby heat is again transferred to the evaporator from the source of heat.

The invention, both as to organization and method, together with the above and further objects and advantages thereof, will be better understood by reference to the following description taken in conjunction with the accompanying drawings forming a part of this specification, and in which:

Fig. 1 more or less diagrammatically illustrates a refrigerator provided with a heat transfer system embodying the invention;

Fig. 3 is a fragmentary view illustrating a modification of the heat transfer system shown in Fig. 1, whereby manual control of heat transfer is effected;

Figs. 4 and 5 are fragmentary views illustrating further modifications of the heat transfer system shown in Fig. 1, whereby automatic control of heat transfer is effected;

Fig. 7 is a fragmentary view illustrating a modification of the heat transfer system shown in Fig. 6.

Figures 1, 2:
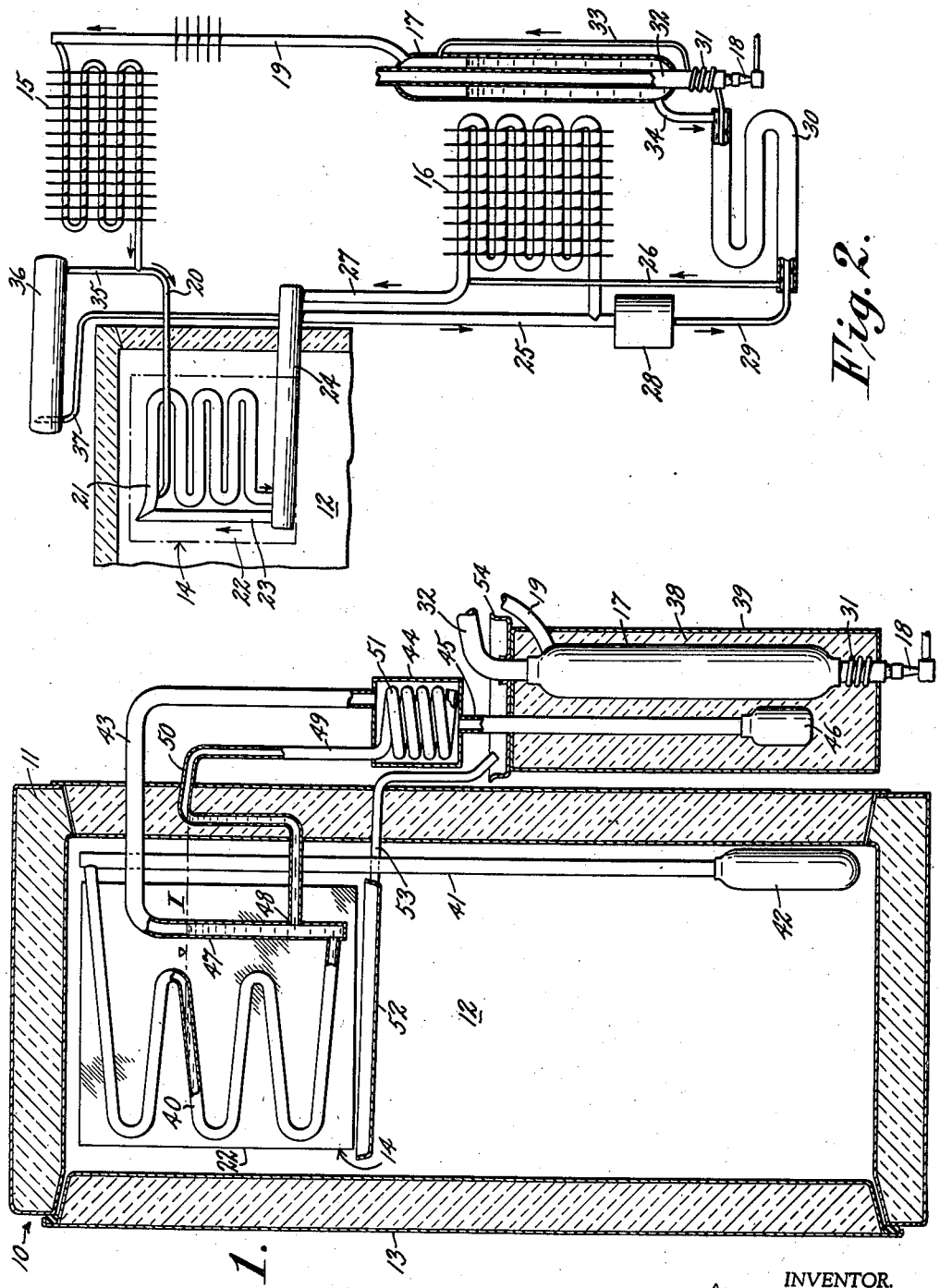
Fig. 2 is a view more or less diagrammatically illustrating a refrigeration system of which parts are shown in Fig. 1.

In Fig. 1 the invention is embodied in a refrigerator including a cabinet 10 having thermally insulated walls 11 defining a storage space 12 into which access is afforded by a door 13. Within storage space 12 is disposed an evaporator or cooling element 14 which may form part of an absorption refrigeration system of a type containing an auxiliary agent.

Such a system is more or less diagrammatically illustrated in Fig. 2 and includes the evaporator 14, a condenser 15, an absorber 16, and a generator 17. These parts are inter-connected in a manner well-known in the part and will briefly be described hereinafter. The system contains a solution of refrigerant in absorption liquid, such as ammonia in water, for example, and also an auxiliary agent or inert gas, such as hydrogen.

The generator 17 is heated in any suitable manner, as by a gas burner 18, for example, whereby refrigerant vapor is expelled from solution in generator 17. Refrigerant vapor flows upwardly through a conduit 19 into the air-cooled condenser 15 where the vapor is condensed and flows through a conduit 20 into evaporator 14 located in storage space 12.

The evaporator 14 includes a coil 21 which is embedded in or otherwise suitably arranged in good heat exchange relation with a shell 22 indicated by dotted lines in Fig. 2 and by solid lines in Fig. 1. Shell 22 is provided with a plurality of compartments (not shown) adapted to receive trays containing matter to be frozen.

Refrigerant fluid in evaporator 14 evaporates and diffuses into inert gas which enters through a conduit 23, thereby producing a refrigerating effect with consequent absorption of heat from the surroundings. The rich gas mixture of refrigerant vapor and inert gas formed in evaporator 14 flows from the lower part thereof through an outer passage of a gas heat exchanger 24 and conduit 25 into the lower part of absorber 16.

In absorber 16 the rich gas mixture flows counter-current to downwardly flowing weak absorption liquid which enters through a conduit 26. The absorption liquid absorbs refrigerant vapor from the inert gas, and inert gas weak in refrigerant flows from absorber 16 through a conduit 27, an inner passage of gas heat exchanger 24, and conduit 23 into the upper part of evaporator 14.

The circulation of gas in the gas circuit just described is due to the difference in specific weight of the columns of gas rich and weak, respectively, in refrigerant vapor. Since the rich gas is heavier than the weak gas, a force is produced or developed for causing flow of rich gas toward absorber 16 and flow of weak gas toward evaporator 14.

Absorption liquid enrich in refrigerant flows from the lower part of absorber 16 into a vessel 28. From vessel 28 enriched absorption liquid flows through a conduit 29 and an inner passage of liquid heat exchanger 30 into a coil 31 disposed about the lower end of generator flue 32. Liquid is raised by vapor-lift action from coil 31 through a tube 33 into the upper part of generator 17. Refrigerant vapor expelled out of solution in generator 17, together with refrigerant vapor entering through tube 33, flows upwardly through conduit 19 into condenser 15, as explained above.

Absorption liquid from which refrigerant has been expelled flows from generator 17 through a conduit 34, outer passage of liquid heat exchanger 30, and conduit 26 into the upper part of absorber 16. This circulation of absorption liquid is effected by raising liquid in tube 33 by vapor-lift action.

The lower end of condenser 15 is connected by a conduit 35, vessel 36, and a conduit 37 to the gas circuit, as at gas heat exchanger 24, for example, so that any inert gas which may pass through the condenser can flow into the gas circuit. Refrigerant vapor not liquefied in condenser 15 flows through conduit 35 to displace inert gas in vessel 36 and force such gas through conduit 37 into the gas circuit. By forcing gas into the gas circuit in this manner, the total pressure in the system is raised, whereby an adequate condensing pressure is obtained to insure condensation of refrigerant vapor in condenser 15.

In Fig. 2 the entire evaporator and other parts of the system connected thereto are diagrammatically shown as being located in storage space 12, while in Fig. 1 only the shell 22 of the evaporator is illustrated to simplify this figure. The generator 17 and other parts of the system, such as liquid heat exchanger 30, for example, are preferably embedded in suitable insulation. In Fig. 1 generator 17 is shown embedded in insulation 38 which is retained within a suitable metal shell 39.

In accordance with this invention evaporator 14 is independently heated to cause melting of frost that is formed thereon, whereby shutting down the refrigeration system or otherwise modifying the operation thereof is avoided when it is desired to defrost the evaporator. Although not to be limited thereto, it is preferred to utilize heat from a part of the refrigeration system to heat evaporator 14 and thereby cause melting of frost.

As shown in Fig. 1, a heat transfer system embodying the invention includes a condensation member 40 which is in the form of a looped coil. The coil 40 may be formed integrally with shell 22 or otherwise arranged in good heat exchange relation therewith, as by welding or soldering, for example. The upper part of coil 40 is connected to the upper end of a conduit 41 which extends vertically downward and to the lower end of which is connected a vessel 42. The vessel 42 may be referred to as a first evaporation member which is located within storage space 12.

The lower part of coil 40 is connected by an inverted U-shaped conduit 43 to a receptacle 44. The bottom of receptacle 44 is connected to downwardly extending conduit 45 which is connected at its lower end to a vessel 46. The vessel 46 may be referred to as a second evaporation member which is disposed within insulation 38 and located close to generator 17.

To the left-hand arm 47 of conduit 43 is connected one end of a conduit 49 having an inverted U-shaped portion 50. The other end of conduit 49 is shaped in the form of a coil 51 which is located within receptacle 44.

The first and second evaporation members 42 and 46, condenser member 40, and inter-connected conduits form a hermetically sealed circuit which is partly filled with a suitable volatile liquid, such as ethyl alcohol, for example, after the circuit has been evacuated. When burner 18 is heating generator 17, the temperature of evaporator 14 and coil 40 may be assumed to be $-10°$ C., the temperature in storage space 12 and at first evaporation member 42 may be about $+6°$ C., and the temperature at the second evaporator member 46 may be around $+70°$ C.

Let us assume that member 46 is empty and that member 42 contains volatile liquid. The volatile liquid in member 42 evaporates and the vapor flows upwardly through conduit 41 into coil 40 where it is condensed. The evaporation of liquid in member 42 takes up heat from storage space 12, and the condensation of vapors in coil 40 gives up heat to evaporator 14.

Due to evaporation of liquid in member 42 and condensation of the vapors in coil 40, the liquid level gradually rises in coil 40 and the left-hand arm 47 of conduit 43. The liquid level also rises in the left-hand arm of inverted U-shaped portion 50 of conduit 49. When the liquid level reaches the level indicated by the dotted line I in Fig. 1, liquid will overflow from the left-hand arm of inverted U-shaped conduit 50. The internal diameter of conduit 49 and coil 51 is sufficiently small so that liquid and vapor cannot freely pass each other therein.

Since the internal diameter of conduit 49 is relatively small, the solid liquid column moves down the upper inclined portion of inverted U-shaped portion 50 with rise of liquid in coil 40. The movement of the liquid column into the right-hand arm of the inverted U-shaped portion 50 is now accelerated, due to the siphon action that takes place. Undisturbed flow of liquid by siphon action is assured through conduit 49 since conduit 43 serves as a vent conduit. Coil 51 is provided at the lower end of conduit 49 to retard the discharge of liquid into receptacle 44.

When the first liquid reaches second evaporation member 46, the pressure therein and in receptacle 44 and conduit 43 rises due to evaporation of the liquid in member 46. Since evaporation member 46 is relatively hot, this pressure rise takes place quite suddenly when the first liquid enters member 46 and thereby tends to prevent flow of liquid into receptacle 44. By properly dimensioning coil 51, however, it can be made certain that sufficient liquid will be made available to effect defrosting of evaporator 14, as will be described hereinafter, before the first liquid reaches evaporation member 46.

This is done by properly selecting the size of coil 51 and connecting conduit 49 to arm 47 at such a point that coil 51 will be filled with liquid when the liquid level in arm 47 falls to the connection point 48. When the first liquid reaches member 46 and the pressure increases due to evaporation of the liquid therein, the liquid columns in inverted U-shaped conduit 50 and coil 51 will be subjected to the same pressure at 48 and the lower open end of coil 51. With such pressure equalization, siphoning of liquid will continue undisturbed into receptacle 44 and thence into evaporation member 46.

With evaporation of liquid in member 46 the vapor pressure continues to increase in conduit 43 and forces liquid downwardly in the left-hand arm 47 below the connection point 48 of conduit 49. The vapor pressure increases sufficiently to cause raising of liquid in coil 40, whereby this liquid overflows into conduit 41 and flows into evaporation member 42. Liquid will flow into evaporation member 42 because the pressure therein is considerably lower than the pressure in evaporation member 46. All of the liquid trapped in coil 40 is forced into evaporation member 42 in the manner just described. The quantity of liquid forced upwardly in coil 40 is dependent upon the size of the coil, which may be relatively small, and the size of the left-hand arm 47 of conduit 43 below the connection point 48.

The quantity of liquid siphoned into evaporation member 46 is dependent upon the size of conduit 50 and coil 51. The liquid in evaporation member 46 evaporates and the vapor flows through conduit 43 into coil 40 where it is condensed. The evaporation of liquid in member 46 takes up heat from generator 17 through the insulation 38, and the condensation of vapor in coil 40 gives up heat to frost formed on evaporator 14, whereby the frost is melted and the evaporator is rendered more effective for cooling. The temperature of the surfaces of evaporator 14 rises rapidly to cause melting of the frost, and a pan 52 may be provided beneath shell 22 to collect the melted frost. The pan 52 may be connected by a conduit 53 to a small vessel 54 fitted about the upper end of generator flue 32 on the top of shell 39. With this arrangement melted frost in pan 52 will flow by gravity into vessel 54 and evaporate in the latter.

The main part of the condensate formed in coil 40, when liquid is evaporating in member 46, is also forced upwardly in coil 40 into evaporation member 42. This is due to the fact that when heat is being transferred from evaporation member 46 to evaporator 14, an excess pressure prevails in member 46 as compared to the pressure in member 42. Since the condensate formed in coil 40 cannot return to member 46 during the defrosting period, the member 46 will become empty in a relatively short time whereby the pressure gradually decreases.

When member 46 becomes dry the pressure therein soon reaches a value dependent upon the temperature of evaporator 14. With member 46 empty the pressure in member 42 also is again solely dependent upon the temperature of evaporator 14. Under these conditions liquid again evaporates in member 42, whereby an evaporation period of this member is started. The vapors formed in member 42 flow into coil 40 where they condense, and the liquid level again rises in coil 40, arm 47, and conduit 49 until liquid again flows from the left-hand arm of inverted U-shaped conduit 50.

It will therefore be understood that two vaporization-condensation circuits have been provided having a common condensation portion. The volatile fluid serves as a heat transfer agent which circulates naturally in a closed system. The volatile liquid evaporates slowly in first evaporation member 42 and gradually accumulates in coil 40. After an interval of time liquid overflows into second evaporation member 46 whereby heat is rapidly transmitted to the surfaces of evaporator 14 to cause melting of frost thereon. After this relatively short defrosting period another interval of time elapses for liquid to accumulate in coil 40 as the result of liquid evaporation in first condensation member 42.

Evaporation member 42 is preferably arranged in storage space 12 in such a manner that a relatively long interval of time will elapse for liquid to evaporate therein in such an amount that liquid will rise sufficiently in coil 40 to overflow into evaporation member 46. This may be accomplished, if desired, by shielding or insulating evaporation member 42 from air in storage space 12 by a slight covering or sheathing in any suitable manner. The rate at which heat is transferred to evaporation member 42 may be made relatively low and the parts of the hermetically sealed circuit may be so dimensioned and selected that overflow of liquid into evaporation member 46 will take place every twenty-four hours, for example. This can be readily done by selecting a volatile liquid in the circuit which will have a low vapor pressure within the temperature range prevailing in storage space 12.

On the other hand, the heat transfer from generator 17 to evaporation member 46 can be made such that, even though the liquid evaporates slowly in evaporation member 42, the liquid overflowing into member 46 will evaporate in a relatively short time, as from three to ten minutes, for example. The amount of liquid overflowing into member 46 is made sufficiently great to transmit enough heat to cause melting of frost on the surfaces of evaporator 14 which has formed during the interval of time between defrosting periods, as a twenty-four hour interval, for example. Since the interval of time between defrosting periods may be limited in the manner just explained, an appreciable amount of frost will not form on the surfaces of evaporator 14 and in this way disturbing interruptions in the production of cold are avoided. The heat transfer system is relatively simple and dependable in operation and does not require any servicing since it is self-actuating and will operate without thermostatically controlled valves and other movable parts, and without changes in an operating condition of the refrigeration system with which it is associated.

The determination of the defrosting period can be selected within wide limits. By determining the quantity of liquid which overflows into evaporation member 46 each time a defrosting period is instigated, the quantity of heat transmitted to the surfaces of evaporator 14 can be made as great as desired.

In order that the heat transfer system described above and shown in Fig. 1 may be incorporated in all types of refrigerators, the system may be modified in the manner illustrated in Fig. 3. In this modification, which is a fragmentary view of the system shown in Fig. 1 with similar parts referred to by the same reference numerals, a simple adjustment is provided whereby each system can be adjusted to meet the different operating and climatic conditions encountered.

In Fig. 3 a liquid accumulation vessel 55 is connected in arm 47 of conduit 43 for the purpose of accumulating a large quantity of liquid for overflow into second evaporation member 46. In overflow conduit 49 is connected a double coil 50a which corresponds to the inverted U-shaped siphon portion 50 in Fig. 1. The coil 50a is preferably formed of elastically flexible material such as, for example, copper-beryllium or copper-bronze. The upper ends of the separate coils forming double coil 50a are connected together to provide a single path of flow for liquid from connection point 48 to receptacle 44.

The double coil 50a is vertically disposed within a housing 56 through the bottom of which the coils extend. A plate 57 is adapted to bear against the upper end of double coil 50a. This plate is fixed to the lower end of a threaded screw 58 which extends through cover 59 of housing 56. By turning screw 58 the highest point 60 of the double coil can be lowered or raised to change the elevation of the overflow point of liquid from arm 47 to receptacle 44. The screw 58 may be provided with or connected to a suitable indicating device, as will be readily apparent.

The height of overflow point 60 controls the intervals of time between the defrosting periods. The modification of Fig. 3 may be so arranged that overflow point 60 can be raised to such a level that the liquid level in vessel 55 will never reach overflow point 60. When this is done the heat transfer system is rendered inoperative to effect defrosting of evaporator 14. With such adjustment of screw 58, first evaporation member 42 will eventually become empty due to evaporation of liquid therein. As will be seen when reference is made to Fig. 1, the liquid accumulating in coil 40 cannot return to member 42. The liquid will therefore remain in coil 40, arm 47, and vessel 55 until overflow point 60 is lowered to permit overflow of liquid into receptacle 44. Defrosting of evaporator 14 can therefore be prevented when it is desired to utilize evaporator 14 for quick freezing of ice cubes and the like.

The more overflow point 60 is lowered, the shorter the intervals of time between the defrosting periods. By employing an accumulation vessel 55 of greater or less diameter the sensitivity of the control device can be varied.

If desired, the modification of Fig. 3 also can be utilized to control the temperature of storage space 12. The adjustment screw 58 may be turned so that the intervals of time between heat transfer periods from generator 17 are relatively short, as a half hour, for example. Since heat is transmitted to evaporator 14 each time liquid overflow takes place into the second evaporation member 46, the average or means evaporator temperature is increased correspondingly when the control device is adjusted for shorter intervals of time between heat transfer periods.

If desired, the temperature of storage space 12 can be controlled automatically. Such a modification is shown in Fig. 4 which is a fragmentary view of the system shown in Fig. 1 with parts similar to those shown in Figs. 1 and 3 being referred to by the same reference numerals. In Fig. 4 the overflow conduit 49 is formed with an upwardly extending U-shaped bend 50b which corresponds to the double coil 50a in Fig. 3 and inverted U-shaped portion 50 in Fig. 1. The U-shaped conduit 50b is preferably formed of suitable thin and elastic or bendable material. The upper arm 61 of conduit 50b is pivotally supported at 62 whereby conduit 50b can be moved downward or upward to raise or lower overflow 60b.

Between pivot 62 and overflow point 60b upper arm 61 is connected through reverse linkage 63 to a bellows 64 supported in any suitable manner. The bellows 64 is connected by capillary tube 65 to a thermal bulb 66 located within storage space 12. The bellows 64, tube 65, and bulb 66 constitute an expansible fluid thermostat which contains a suitable volatile fluid that increases and decreases in volume with corresponding changes in temperature. With decrease in temperature the volatile fluid becomes reduced in volume, whereby bellows 64 contracts and moves U bend 50b downward about pivot 62 by action of reverse linkage 63. This lowers overflow point 60b whereby the intervals of time between heat transfer periods from generator 17 are shortened. Thus heat is transferred more frequently to evaporator 14 and the average or mean temperature of the latter is increased.

Conversely, with increase in temperature the volatile fluid in the expansible fluid thermostat increases in volume and causes bellows 64 to expand, whereby U bend 50b is moved upward about pivot 62. This raises overflow point 60b whereby the intervals of time between heat transfer periods from generator 17 are lengthened. Thus heat is transferred less frequently to evaporator 14 and the average or mean temperature of the latter is reduced. In the modification of Fig. 4, therefore, automatically instigated defrosting periods dependent upon the height of overflow point 60b are subject to changes caused by the expansible fluid thermostat which controls the temperature of storage space 12.

In Fig. 5 is illustrated another modification of a thermostatic control generally like that of Fig. 4, whereby the temperature of storage space 12 is automatically controlled. The modification of Fig. 5 is similar to that shown in Fig. 1 with similar parts referred to by the same reference numerals. In Fig. 5 a conduit 67 connects the low end of arm 47 and evaporation member 46. A valve 68 is connected in conduit 67 to control flow of liquid into member 46. Valve 68 is automatically controlled by an expansible fluid thermostat similar to that shown in Fig. 4 and including a capillary tube 69 and a thermal bulb 70.

In operation, when the temperature of storage space 12 tends to fall below a desired value, the expansible fluid thermostat including thermal bulb 70 causes valve 68 to open and permit liquid to flow into evaporation member 46. The liquid in member 46 evaporates and heat is thereby transmitted to evaporator 14, whereby the temperature of the latter is increased. Conversely, when the temperature of storage space 12 tends to rise above the desired value, the expansible fluid thermostat causes valve 68 to close whereby liquid can no longer flow into member 46. Evaporation member 46 will therefore boil dry and heat no longer will be transmitted from generator 17 to evaporator 14. Thus, the average or mean temperature of evaporator 14 will be reduced. The temperature control just described is superimposed on the automatic defrosting effected by the heat transfer system and operates independently of the intermittent defrosting of evaporator 14.

With the heat transfer systems described above, the first evaporation member 42 can be utilized for the purpose of abstracting heat from air in storage space 12. This heat is given up to evaporator 14 by the condensation in coil 40 of the vapors which are formed in evaporation member 42. This may be done by providing member 42 with heat transfer fins or by increasing its heat transfer surface in any other suitable manner. Preferably member 42 in such case should be in the form of a looped coil located at the rear wall of storage space 12 or in a horizontal plane below evaporator 14. The heat transfer surface should be sufficiently large or the volatile liquid should be chosen to keep evaporation member 42 at a temperature above freezing so that frost will not form thereon. When member 42 is made sufficiently large to keep storage space 12 at a desired low temperature by itself, evaporator 14 can be insulated and used solely for freezing ice cubes and the like.

When evaporation member 42 is employed for cooling storage space 12 it is desirable to retain the essential features of the invention and include the evaporation member in a heat transfer system of the character described, whereby heat can be transmitted to evaporator 14 from generator 17. In such heat transfer system suitable control may be provided like that shown in Figs. 3 to 5 inclusive. Thus, evaporation member 42 may be thermostatically or manually controlled, and, if desired, may be rendered inoperative to effect cooling of storage space 12. When this is done no heat is transmitted from generator 17 to evaporator 14 and maximum freezing can be effected by the latter. As pointed out above, this can be accomplished in the manner shown in Fig. 3 by turning adjusting screw 58 so that liquid in coil 40 and vessel 55 can never reach overflow point 60. On the other hand, when there is a particularly great demand for cooling storage space 12, evaporation member 42 can readily be made operative to abstract heat from the space by turning adjusting screw 58 so that overflow point 60 is lowered.

Figure 6:
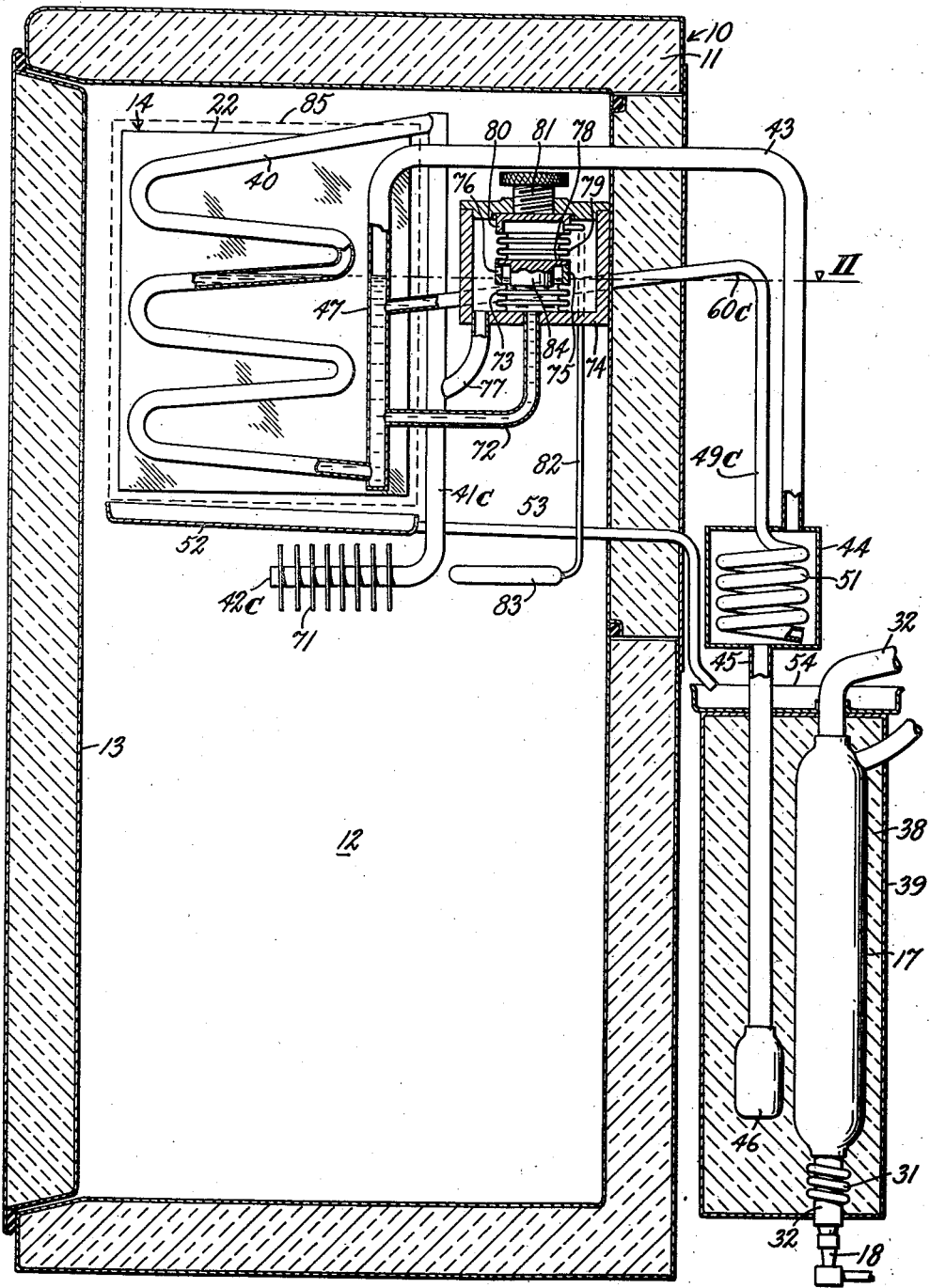
Fig. 6 is a view similar to Fig. 1 illustrating a still further modification of the invention in which a portion of the heat transfer system is utilized to effect cooling of an enclosed space.

In Fig. 6 is illustrated a modification of the invention in which evaporation member 42c is employed for cooling storage space 12. The member 42c is provided with a plurality of heat transfer fins 71 to provide a relatively extensive heat transfer surface. The parts in Fig. 6 which are similar to those shown in the previous figures are designated by the same reference numerals. The conduit 49c, which corresponds to conduit 49 in Fig. 1, provides a fixed overflow point 60c.

Between the connection of conduit 49c to arm 47 and the lower end of this arm is connected a conduit 72. The upper end of conduit 72 is in communication with an expansible and contractible bellows 73. The lower end of bellows 73 is secured to the bottom of a housing 74 and the upper end is secured to an annular member 75 having an opening 76. To the bottom of housing 74 is connected a conduit 77 which is connected at its lower end to conduit 41c. Thus liquid can flow into evaporation member 42c through conduit 72, bellows 73, opening 76, housing 74, and conduits 77 and 41c.

To the upper edge of annular member 75 is fixed a plate 78 to which is secured the lower end of a second expansible and contractible bellows 79. The upper end of bellows 79 is secured to a plate 80 which can be moved vertically by an adjusting screw 81 extending through the top of housing 74. The bellows 79 is connected to one end of a capillary tube 82 which is connected at its other end to a thermal bulb 83. These parts contain a volatile fluid which increases and decreases in volume with corresponding changes in temperature. The plate 78 is formed with a piston or displacement member 84, whereby the volume of liquid held in bellows 73 can be changed when the piston is raised and lowered.

With adjusting screw 81 in its uppermost position piston 84 is at its highest level, whereby the volume of liquid that can be held by lower bellows 73 is at a maximum for the temperature existing in storage space 12. Under these conditions coil 40, arm 47, the lower inclined portion of conduit 49c, conduit 72, and bellows 73 can receive and hold the entire quantity of volatile liquid in the heat transfer system. Thus evaporation members 42c and 46 are empty and no liquid can overflow past overflow point 60c into member 46 and no liquid can overflow through opening 76 into member 42c. No heat is, therefore, being transferred from storage space 12 to evaporator 14 by means of circulating volatile fluid. If evaporator 14 in Fig. 6 is provided with an insulating covering, as indicated by the dotted line 85 in Fig. 6, all of the cold produced by the evaporator will be effective for freezing ice cubes and the like in shell 22, because under the conditions stated no heat is being transmitted to evaporator 14 from evaporation members 42c or 46. Under these conditions let us assume that the liquid level is substantially at the height indicated by dotted line II.

In order to render evaporation member 42c operative for cooling storage space 12, adjusting screw 81 is moved downward so that piston 84 will displace liquid from bellows 73 and thereby shorten the bellows. In so doing, liquid in bellows 73 will flow through opening 76, housing 74, and conduits 77 and 41c into member 42c. The liquid in member 42c evaporates and the vapor flows through conduit 41c into coil 40 where it is condensed. Evaporation of liquid in member 42c takes up heat from storage space 12, and the condensation of the vapors in coil 40 gives up heat to evaporator 14. The condensate or liquid formed in coil 40 returns to evaporation member 42c through conduit 72, bellows 73, opening 76, and conduits 77 and 41c. Thus the temperature of storage space 12 is reduced by natural circulation of volatile fluid in the portion of the heat transfer system described.

When the temperature of storage space 12 tends to fall below a desired value, the fluid in the expansible fluid thermostat becomes sufficiently reduced in volume and bellows 79 contracts, whereby the bellows 73 is expanded or lengthened. When this occurs opening 76 assumes a higher position so that liquid cannot flow through the opening into housing 74 and thence into evaporation member 42c. With no liquid entering member 42c the amount of heat abstracted from storage space 12 is reduced.

Let us assume that opening 76 has been raised to a higher level than overflow 60c by the action of the expansible fluid thermostat. With continued evaporation of liquid remaining in member 42c, the liquid level will gradually rise in arm 47, bellows 73, and the inclined portion of conduit 49c. Since overflow 60c is now at a lower level than opening 76, liquid will first reach overflow point 60c. When liquid does reach the level of the overflow point, liquid will overflow through conduit 49c and coil 51 into receptacle 44 and thence into evaporation member 46. With liquid in member 46 heat is transmitted from generator 17 to coil 40, whereby the temperature of evaporator 14 is raised for a short interval of time depending upon the amount of liquid overflowing into member 46.

If the temperature of storage space 12 rises above the desired value due to heat transfer from generator 17, the expansible fluid thermostat causes upper bellows 79 to expand whereby lower bellows 73 is contracted and opening 76 may be lowered considerably below overflow point 60c. In such case liquid will only overflow through opening 76 into evaporation member 42c to render the latter operative again to effect cooling of storage space 12.

When evaporator 14 is not provided with an insulating covering, defrosting is effected during the periods when heat is transmitted from generator 17 to evaporator 14. As in the embodiment of Fig. 1, liquid is forced from coil 40 into member 42c during such defrosting periods due to the higher pressure prevailing in member 46 as compared to the pressure in member 42c. Evaporator 14 may be primarily used for freezing ice cubes and the like and provided with limited heat transfer surface, while evaporation member 42c can be used primarily for cooling storage space 12 and provided with relatively extensive heat transfer surface.

In the modification of Fig. 6 the heat transfer system first may be operated so that evaporation member 42c is rendered inoperative, whereby all of the cold produced by evaporator 14 can be made available for freezing ice cubes and the like. Second, the temperature of storage space 12 can be controlled automatically by short periods of operation of evaporation member 42c alternating with short periods of operation of evaporation member 46; or by rendering evaporation member 46 completely inoperative and controlling flow of liquid into member 42c by raising and lowering of opening 76. Third, at desired intervals of time automatic defrosting of evaporator 14 can be effected or defrosting can be completely prevented when quick freezing is desired.

When adjusting screw 81 in Fig. 6 is turned so that both evaporation members 42c and 46 will become empty, as when it is desired to utilize all of the cold produced by evaporator 14 for freezing, it is particularly desirable not to overlook subsequently returning screw 81 to such a position that member 42c will again become operative to effect cooling of storage space 12. One way of insuring that member 42c will always be rendered operative for cooling storage space 12 at the termination of a quick freezing period is illustrated in Fig. 7. This figure is a fragmentary view of the modification shown in Fig. 6 and differs from the latter in that a plunger 86 is connected to plate 80 in place of adjusting screw 81. A lever 87 pivoted at 88 is pivotally connected at one end at 89 to the upper end of plunger 86. A U-shaped leaf-spring 90 is connected to the other end of lever 87. The outer end of spring 90 is shaped to provide a handle 91. A pin 92 on shell 22 limits downward movement of the outer end of lever 87.

In Fig. 7 the spring 90 is shown engaging the outer end of a tray 93 located in a freezing compartment of shell 22. In this position of lever 87 the bellows 79 is in its uppermost position and lower bellows 73 is expanded so that it will hold the maximum amount of liquid. This relative position of bellows 73 and 79 is shown in Fig. 6, and under these conditions all of the liquid in the heat transfer system can be held in coil 40, arm 47, conduit 72, bellows 73, and the lower inclined portion of conduit 49c. As stated above in connection with the description of the modification of Fig. 6, all of the cold produced by evaporator 14 is made available for freezing ice cubes and the like under these conditions, because evaporation members 42c and 46 will both be empty.

When it is desired to use ice cubes or other frozen matter in tray 93, the latter can only be removed from shell 22 by raising handle 91. This is done by pressing handle 91 inwardly and raising the same so that spring 90 snaps around pin 92. When spring 90 is raised, plunger 86 is lowered whereby lower bellows 73 is contracted and opening 76 is lowered. At the same time piston 84 will displace liquid in lower bellows 73 and such liquid will overflow through opening 76 into evaporation member 42c. When this occurs member 42c becomes effective to abstract heat from storage space 12 by means of the volatile fluid circulating in a closed circuit including member 42c and coil 40.

Although several embodiments of the invention have been shown and described, it will be apparent to those skilled in the art that various modifications and changes may be made without departing from the spirit and scope of the invention. It is therefore contemplated to cover all modifications and changes which come within the spirit of the invention, as pointed out in the following claims.

What is claimed is:

1. A vaporization-condensation heat transfer circuit partly filled with a volatile liquid and including two evaporation members and a common condensation member, trap means in said circuit capable of withholding liquid from both of said evaporation members, said trap means being so constructed and arranged that liquid will flow to one of said evaporation members upon rise of liquid level in said trap means and liquid will flow to the other of said evaporation members upon increase in pressure in said circuit resulting from evaporation of liquid in said one evaporation member, and means for controlling said trap means to raise or lower the level to which liquid must rise therein before flowing to said one evaporation member.

2. In the art of refrigeration having a cooling surface subject to formation of frost or ice, that improvement which consists in vaporizing and condensing a fluid to transfer heat to said cooling surface at a rate insufficient to cause melting of the frost or ice, collecting the fluid in liquid phase formed as a result of said condensation, and, when a predetermined quantity thereof has been collected, vaporizing and condensing a part of the collected fluid to transfer heat to the frost or ice at a temperature above the melting point thereof and at a rate sufficient to cause melting of the frost or ice.

3. In a refrigerating system in which fluid circulates and having a cooling surface subject to formation of frost or ice, a fluid heat transfer circuit external to fluid circulating in the system and having a portion in heat transfer relation with said cooling surface, said heat transfer circuit being constructed and arranged to operate independently of changes in an operating condition of said refrigerating system and being self-actuating to cause flow of heated fluid to said portion in heat transfer relation with said surface to transfer heat to said frost or ice at a temperature above the melting point thereof and at a rate sufficient to cause melting of the frost or ice.

4. In a refrigerator having a thermally insulated storage space and a cooling element for cooling said space, said cooling element being subject to formation of frost or ice, a vaporization-condensation heat transfer circuit partly filled with a volatile liquid and including a first evaporation member in thermal transfer relation with said space, a second evaporation member outside said space, and a condensation member in heat exchange relation with said cooling element, structure connected in said circuit whereby liquid may be conducted to said first and second evaporation members, and means to heat said second evaporation member whereby heat is transferred to said frost or ice at a temperature above the melting point and at a rate sufficient to cause melting of said frost or ice when liquid is conducted to said second evaporation member.

5. Apparatus as set forth in claim 4 wherein said structure includes trap means capable of withholding liquid from both of said evaporation members, and said structure being so constructed and arranged that liquid may be conducted to said second evaporation member upon rise of liquid in said trap means and liquid may be conducted to said first evaporation member upon increase in pressure in said circuit resulting from evaporation of liquid in said second evaporation member.

6. Apparatus as set forth in claim 4 wherein said structure includes trap means capable of withholding liquid from both of said evaporation members, and means for controlling said structure whereby all of the liquid in said circuit is retained in said trap means or automatically conducted alternately to said first and second evaporation members.

7. Apparatus as set forth in claim 4 and including means for controlling said structure whereby liquid is alternately conducted to said first and second evaporation members or only to said first evaporation member.

8. Apparatus as set forth in claim 4 and including means responsive to temperature of the storage space for controlling said structure whereby liquid is alternately conducted to said first and second evaporation members or only to said first evaporation member.

9. In a refrigerating system in which fluid circulates and having a cooling surface subject to formation of frost or ice, a volatile fluid heat transfer circuit external to fluid circulating in the system and including a vaporization portion adapted to be heated and a condensation portion in heat transfer relation with said cooling surface, said circuit being so constructed and arranged that it is self-actuating to cause intermittent flow of fluid from said vaporization portion to said condensation portion to transfer heat to said frost or ice at a temperature above the melting point thereof and at a rate sufficient to cause melting of the frost or ice.

10. The combination with a refrigeration system in which fluid circulates and having a cooling element subject to formation of frost thereon, structure comprising a heater external to fluid in said system for rapidly melting said frost, said structure being constructed and arranged to operate independently of changes in an operating condition of said refrigeration system and being self-actuating to start said heater at intervals and subsequently stop said heater.

11. In combination with a refrigeration system in which fluid circulates and having a high temperature part and a low temperature part, the latter being subject to formation of frost or ice thereon, structure providing a path of flow for fluid external to fluid in said system for conducting heat from said high temperature part to said low temperature part to transfer heat to said frost or ice at a temperature above the melting point thereof and at a rate sufficient to cause rapid melting of the frost or ice, said structure being constructed and arranged to operate independently of changes in an operating condition of said system and embodying means so that it is self-actuating to intermittently cause flow of fluid in said path.

12. In combination with a refrigerating system in which fluid circulates and having a high temperature part and a low temperature part, the latter being subject to formation of frost or ice thereon, structure external to fluid circulating in the system and providing a path of flow for fluid for conducting heat from said high temperature part to said low temperature part at a temperature above the melting point of frost or ice and at a rate sufficient to cause rapid melting of the frost or ice, said structure being constructed and arranged so that it is self-actuating to intermittently cause flow of fluid in said path, and means associated with said structure to regulate said intermittent flow of fluid in said path.

13. Refrigeration apparatus having a high temperature part and a low temperature part, the latter being subject to formation of frost or ice thereon, structure providing a path of flow for fluid for conducting heat from said high temperature part to said low temperature part to cause rapid melting of said frost or ice, said structure being constructed and arranged so that it is self-actuating to intermittently cause flow of fluid in said path, and means responsive to a temperature condition affected by said low temperature part for regulating said structure to determine when intermittent flow of fluid is instigated in said path.

14. A vaporization-condensation heat transfer circuit partly filled with a volatile liquid and including two evaporation members and a common condensation member, liquid holding means in said circuit capable of withholding liquid from both of said evaporation members, said liquid holding means being so constructed and arranged that liquid may flow therefrom to one of said evaporation members upon rise of liquid in said liquid holding means and liquid will flow to the other of said evaporation members upon increase in pressure in said circuit resulting from evaporation of liquid in said one evaporation member, and structure embodied in said heat transfer circuit so located that liquid may flow from said liquid holding means to said other evaporation member without flow of liquid to said one evaporation member, and said last-mentioned structure being controllable to prevent flow of liquid from said liquid holding means to said other evaporation member without flow of liquid to said one evaporation member.

15. A vaporization-condensation heat transfer circuit partly filled with a volatile liquid and including two evaporation members and a common condensation member, liquid holding means in said circuit capable of withholding liquid from both of said evaporation members, said liquid holding means being so constructed and arranged that liquid may flow therefrom to one of said evaporation members upon rise of liquid in said liquid holding means and liquid will flow to the other of said evaporation members upon increase in pressure in said circuit resulting from evaporation of liquid in said one evaporation member, and structure embodied in said heat transfer circuit so located that liquid may flow from said liquid holding means to said other evaporator without flow of liquid to said one evaporation member, and said structure including means responsive to temperature to control the last-mentioned flow of liquid from said liquid holding means to said other evaporation member.

GUNNAR GRUBB.